United States Patent [19]

Mariusson et al.

[11] Patent Number: 4,716,188

[45] Date of Patent: Dec. 29, 1987

[54] WATER-REPELLENT AND VAPOR-PERMEABLE PAINT

[76] Inventors: Oskar Mariusson, Lindarflot 3, IS-210 Gardabae 3; Jon Bjarnason, Safamyri 21, IS-108 Reykjavik, both of Iceland

[21] Appl. No.: 871,278

[22] Filed: Jun. 6, 1986

[30] Foreign Application Priority Data

Jun. 11, 1985 [DK] Denmark .............................. 2596/85

[51] Int. Cl.$^4$ ............................ C08K 5/54; C08K 3/34
[52] U.S. Cl. .................................. 524/268; 524/269; 524/448; 524/506
[58] Field of Search ................ 524/269, 448, 506, 268

[56] References Cited

U.S. PATENT DOCUMENTS 2,575,577  11/1951  Beauchamp ......................... 524/448
3,849,357  11/1974  Wolf ..................................... 524/506

FOREIGN PATENT DOCUMENTS 127075    3/1975  Denmark .
0618462   7/1980  Japan ................................... 524/506
0180563  10/1983  Japan ................................... 524/506
834962    5/1960  United Kingdom ................ 524/506

*Primary Examiner*—Lewis T. Jacobs
*Assistant Examiner*—David W. Woodward
*Attorney, Agent, or Firm*—Murray and Whisenhunt

[57] ABSTRACT

A paint for outdoor surfaces and surfaces in wet rooms, especially for concrete walls exposed to strong weathering, contains pigment, binder of which a part is (meth-)acrylic polymers and/or copolymers, volatile solvent(s), fillers and optionally known additives and it is characterized by (a) having a pigment-volume concentration of 47 to 65%, preferbly 55 to 60%, (b) containing diatom shells as part of the filler, and (c) containing one or more oligomieric alkyl-alkoxy-organosiloxanes as part of the continuous binder phase. There is obtained on one hand a high degree of imperviousness to water in the liquid form and on the other hand a high degree of diffusion of aqueous vapor.

5 Claims, 2 Drawing Figures

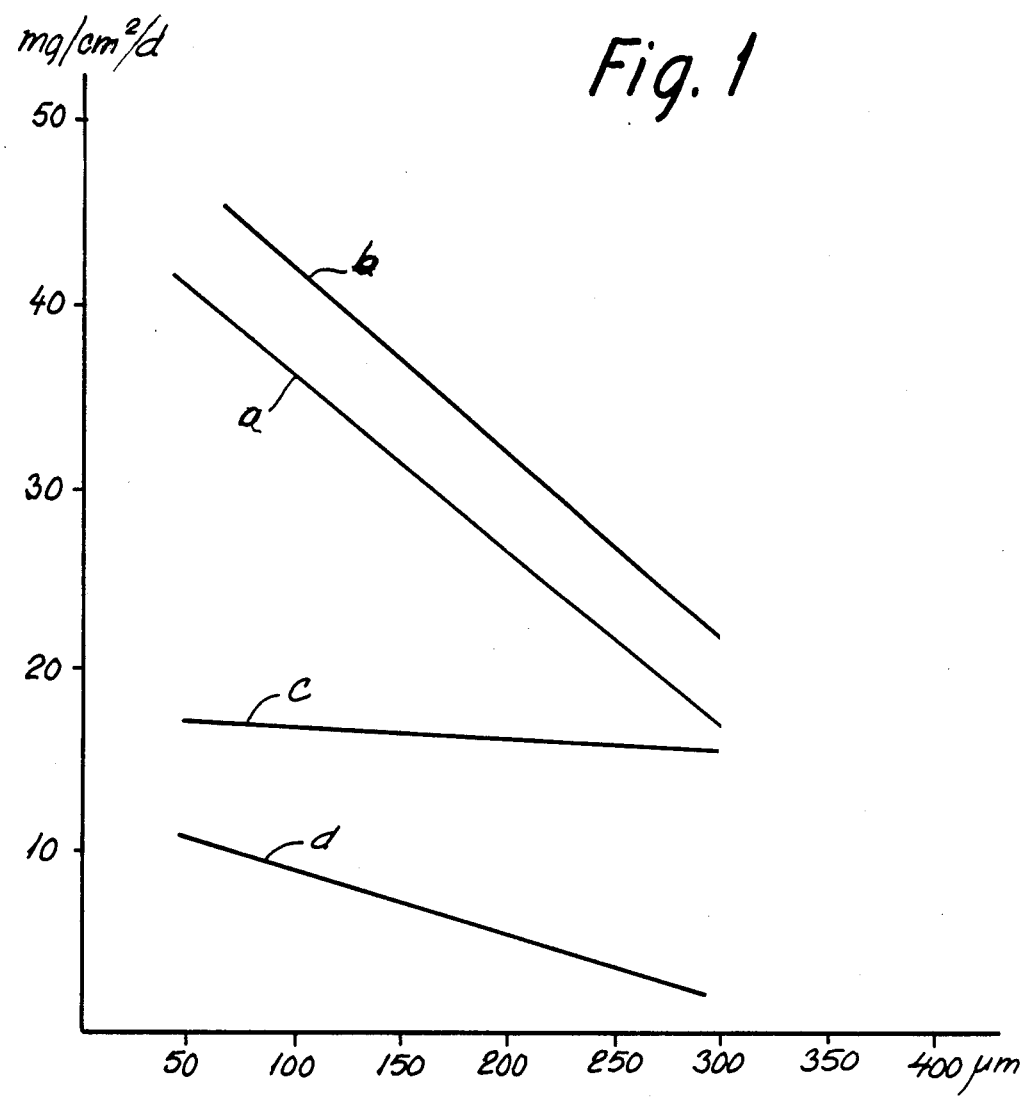

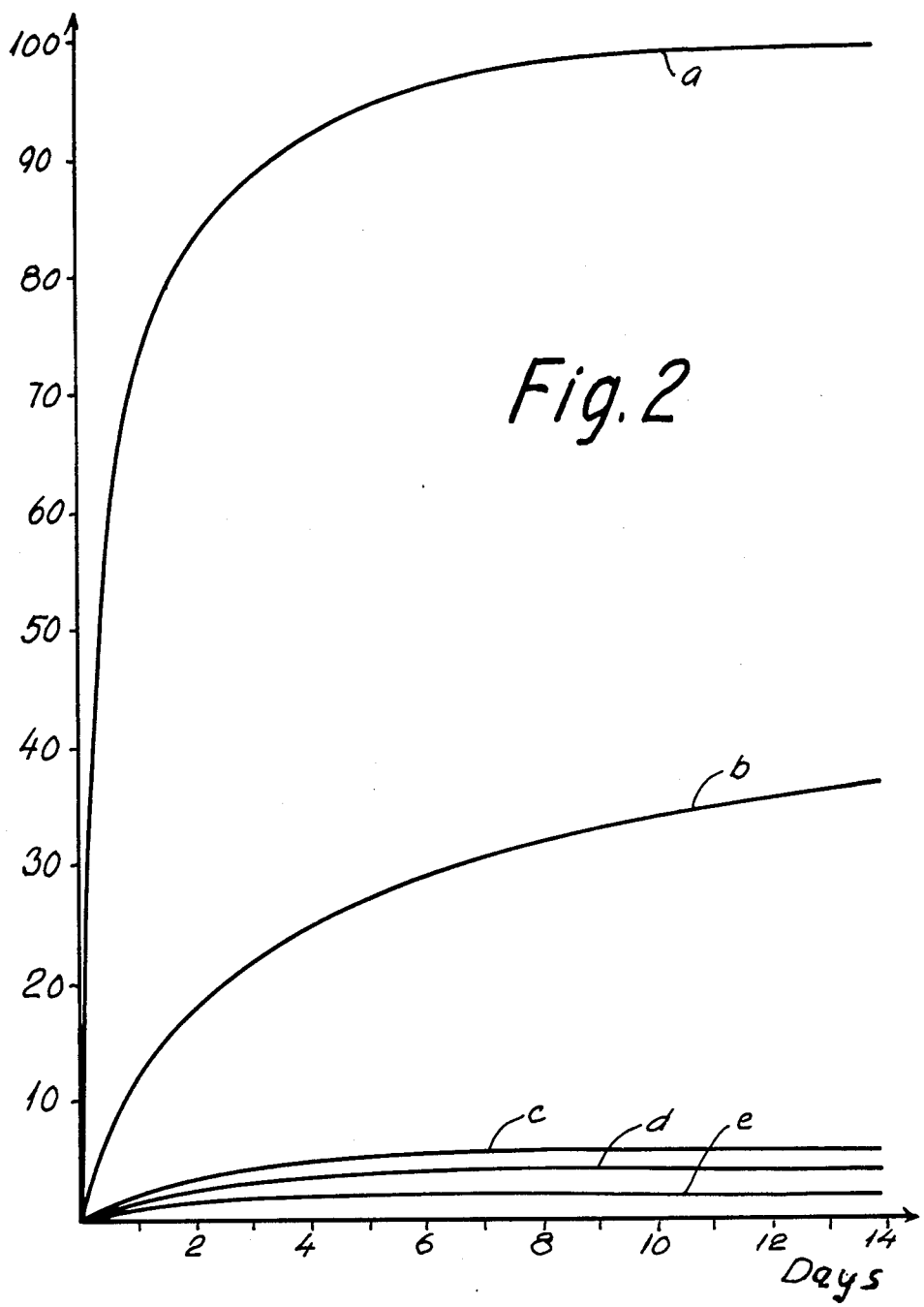

WATER-REPELLENT AND VAPOR-PERMEABLE PAINT

The present invention relates to a paint giving watertight coatings which are permeable to aqueous vapour, and is especially meant for outdoor surfaces, notably concrete surfaces, or walls in the socalled wet rooms such as bathrooms and rinsing and wash rooms as well as rooms in food manufacturing plants where the very high demands of hygiene require cleaning with large amounts of water sprayed thereon. The paint according to the invention is an acryl-based paint containing one or more pigments, a continuous phase consisting of at least one volatile organic solvent, at least one organic binder of the basis of acrylic or methacrylic polymers and/or copolymers, at least one non-crosslinked oligomeric alkyl-substituted organosiloxane and optionally other binders compatible therewith, and optionally additives and particulate extenders known per se.

A large number of paints of this kind are known. The ratio of the various components may vary rather much and in many cases they may be characterized by various key figures. One of these is the pigment-volume concentration, frequently abbreviated to PVC, which represents the percentage of the total volume of pigments including extender relative to the volume of non-volatile binder plus volume of pigment:

$$PVC = \frac{\text{volume of pigment + extender}}{\text{volume of binder + pigment + extender}} \cdot 100$$

In the remainder of the specification with claims particulate extenders are encompassed by the word "pigment" whenever speaking of PVC.

When calculating the PVC one has to disregard volatile solvents because they will not be present in the paint film after the paint has been coated on the substrate and dried. If the concentration of pigment in the paint is low even in the dry paint film each particle thereof will be entirely enclosed by binder. At increasing pigment concentration this will also be the case up to a certain limit at which the amount of binder is just sufficient to enclose all of the particles. The point where the amount of binder is exactly sufficient for such enclosure is sometimes called the critical pigment-volume concentration, CPVC. At values above CPVC the dry paint film may contain voids and become porous and generally permeability, strength and gloss may hereby be influenced unfavourably; in case of outdoor paints especially the weatherproofness may become unsatisfactory.

Two properties have a particular importance for paint films on outdoor walls, notably concrete walls, and walls in wet rooms, even there especially if the wall is of a porous concrete, viz. firstly its water-repellent ability or imperviousness to water, and secondly its permeability to aqueous vapour, which should also be high. These two properties are opposite each other in so far as a highly waterproof or water-repellent paint will normally be diffusible for aqueous vapour to a very small degree, whereas a paint permitting a high degree of diffusion of aqueous vapour is hydrophobic or waterproof to a comparatively small degree.

The water-repellant ability and permeability for aqueous vapour is partly determined by the properties of the pigment, the fillers and notably the binder, particularly of the more or less hydrophobic or hydrophilic properties of the binder, but partly even by the PVC value. Under otherwise like conditions a low PVC will provide a dense and weatherproof film, whereas higher values of PVC will render the paint more diffusible but at the same time decrease the weatherproofness.

It is known to enhance the water-repellent properties of paints by incorporating substances therein which have outspoken hydrophobic properties. It is known to incorporate siloxanes into the paint together with other hydrophobic binder components. Thus, it is stated in the introductory part of DE patent specification No. 21 50 736 that it is known to use vinyl chloride copolymers, chloro rubber, copolymers of acrylic esters, optionally with styrene and vinyl toluene, and siloxane resins as binders in modern pigment-containing facade paints; the publication concretely suggests the use of a mixture of (a) siloxane resins and (b) copolymers or terpolymers of methylmethacrylate with acrylic acid esters, carboxylic acids or carboxylic acid esters, vinyl toluene or styrene. It is stated that such a paint can penetrate into the outer layers of the surface to be painted, i.e. act to impregnate it and to be water-repellent. The kind of siloxane resins is not stated. DK patent application No. 1270/75 alleges to show an improvement of the paint claimed in DE No. 21 50 736, viz. thereby that the siloxane resins, which must constitute 10–50% by weight of the methacrylic acid ester copolymers, must be of comparatively low molecular weight and correspond to the general formula

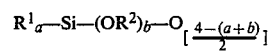

wherein $R^1$ denotes methyl or phenyl, $R^2$ $C_{1-4}$ alkyl, a has a value 0.5–1.8 and b a value 0.2–2.5, preferably 0.3–1.2. It is stated that the groups $OR^2$ may condense, which probably means a polymerisation of the siloxane, and that this may be promoted by alkylacyl tin compounds. The publication says, i.a., that surfaces treated with such a paint have a high degree of vapour diffusion although it has not been explained or can be directly seen from the description what would cause the high vapour diffusion. The paints known from DE No. 21 50 736 and DK No. 1270/75 have values of PVC about 40%, which under otherwise like conditions will give a good water-repellent ability and a poor diffusion of aqueous vapour, estimated at below 5 mg $H_2O/cm^2$/day at a film thickness of about 100–200 μm.

It should also be mentioned that from DE patent publication No. 1671280 there is known an impregnating agent, without pigment, for conferring water-repellent properties to building materials and consisting of a mixture of methyl polysiloxanes plus 2–100% by weight (calculated on the polysiloxanes) of polymethacrylic acid methyl ester or copolymerisates of vinyl chloride. Methyl polysiloxanes are preferred that correspond to the general formula

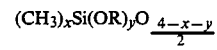

wherein R is hydrogen or $C_{1-4}$ alkyl, x and y each is a number 0–3, the sum thereof being at most 4, whereby it is preferred that x has an average value of 0.9–1.2 and y of 0.01–0.20.

A paint described in DE patent publication No. 23 52 242, particularly for protecting facades such as concrete facades, which paint contains pigment and as a binder copolymerisates of methacrylic acid esters has in the binder, in order to increase the water-repellent properties, a content of lower molecular weight methyl, phenyl or methylphenyl siloxanes in an amount of 10-50% by weight of the copolymerisate, and preferably also a catalyst for the siloxanes, e.g. an organotin compound. The siloxanes are stated to polymerise to form higher molecular weight compounds, which improves the water-repellancy. It is stated in the publication, i.a., that the paint has a high degree of vapour diffusion although it is not stated how high or which components of the paint are supposed to cause the high vapour diffusion. This piece of information must astonish since the examples do not show a very high pigment and extender content, which might conceivably explain a high degree of openness to diffusion. On the basis of the composition of the paint shown in the examples its PVC like the PVC of those known from DE No. 2150736 and DK No. 1270/75 is estimated to be within the range of 37-44%, which without special measures, of which as mentioned nothing is said, will hardly give a diffusion of aqueous vapour of more than about 5 mg/cm$^2$/day at normal thickness of the paint film (e.g. 100-200 μm).

From DE patent publication No. 23 07 422 there is known a water-repellent coating composition consisting of an inert carrier liquid, a resin-like binder and one or more metal or metalloid oxides the surface of which has been rendered hydrophobic with an organic silicon compound, e.g. a siloxane of the formula

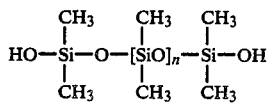

wherein n is an integer and the hydroxy groups may be blocked, or a disilazane such as (CH$_3$)$_3$SiNHSi(CH$_3$)$_3$ or (C$_4$H$_9$)$_3$SiNHSi(C$_4$H$_9$)$_3$. A coating formed by such a composition must be expected to be surface-hydrophobic and hence give a good water-repellancy.

In DK patent specification No. 132015 it is described how one can impart water repellancy and decoration to building materials, which may contain free calcium oxide, viz. by coating them with a film-forming coating composition consisting of (a) a film-forming high molecular weight polymer obtained by the copolymerisation of acrylic acid esters and/or methacrylic acid esters with each other or with styrene, α-methylstyrene or styrenes substituted in the ring with alkyl, (b) a dispersing agent, (c) a water-repellent agent, e.g. fatty acid amides, fatty amines or alkylene oxide-fatty acid condensates, (d) a solvent, (e) a pigment and/or a mineral charge, (f) an antifoaming agent and (g) a coalescence agent. A mineral charge (e) may, e.g., be gypsum, magnesium silicate, magnesium or calcium carbonate, pyrophyllite, mica, pumice, silica, diatomite, barium sulphate, alumina or mixtures thereof. The coating becomes dense and water-repellent, but nothing in the specification suggests it to be open to diffusion of aqueous vapour and neither does the composition suggest that.

Thus, it is seen that it is well known to render paints watertight or hydrophobic, and also known that organic silicon compounds may be present together with the binder.

It is also commonly known that paints, especially water-based paints may be open to the diffusion of aqueous vapour, but such openness to diffusion is generally accompanied by poor watertightness. Especially it is clear that the permeability to aqueous vapour may be increased, to some degree at the cost of the watertightness, by increasing the PVC value.

A typical diffusion-open paint of this kind is described in an undated publication "Pliolite resins for Surface Coating" from Good Year Chemical Division. The recipe for a paint discloses a comparatively high PVC value and states a content of pigment plus fillers in the form of pulverized mica and dolomite at a total weight of about ⅔ of the amount of pigment and moreover accompanied by a coarse filler. The recipe is stated to provide a weatherproof paint film but the degree of openness to diffusion cannot be estimated. Even in other connections it is known to use silica in the form of diatoms, diatomaceous earth or kieselguhr as filler in paints.

In the Good Year brochure nothing is said to the effect that the paint is especially water-repellent, and the recipe given does not suggest the use of particularly hydrophobic components.

It is the object of the invention to provide a paint of the kind specified, especially for concrete surfaces outdoor or in "wet" rooms, which combines a good water-repellent property with a high degree of diffusion-openness to aqueous vapour. As intimated above these two properties to some degree are complementary, but nevertheless we have succeeded in combining them if according to the invention a paint of the kind stated has the following properties in combination:

(a) a pigment-volume concentration (PVC) in the range of 47 to 65%, (b) as a part of the filler contains diatom shells such as kieselguhr, and (c) as a part of the continuous phase contains one or more non-crosslinked alkyl/alkoxy oligomeric organo-siloxanes having the structure

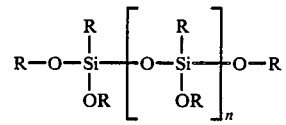

wherein the groups R, which may be identical or different, each denotes a C$_{1-8}$ alkyl group and n is a number 3-8.

The PVC-range given in itself will tend to cause some degree of openness to diffusion but at least in the upper end of the range, e.g. at a PVC-value of 60-65%, there may be a risk of unsatisfactory weather-proofness if the other components of the combination are not satisfied. Even at the higher PVC-values within the range given there is not certainty of optimum openness to diffusion of aqueous vapour, and within the lower part of the range, e.g. at a PVC-value of 47-54%, the openness to diffusion may be insufficient unless special components are present as specified as the other parts of the combination.

The second part of the combination, the presence of diatom shells, has the function to ensure a considerable degree of openness to diffusion within the entire range of PVC stated. Because of the specific structure of the diatom shells, with a large number of very fine channels in the siliceous skeleton, they are supposed to form in the paint film numerous "corridors" or channels well suited for vapour transport.

Without special measures, however, these "corridors" will act as capillaries through which water in liquid form (and other liquids of low viscosity) may penetrate from the outer surface to the substrate coated with the paint. Since the capillaries in diatom shells are very narrow, the capillary forces are very high. The third component of the combination according to the invention has to counteract the transportation of liquid via the capillaries. As explained above siloxanes of the type specified are highly hydrophobic, and by virtue of this property they serve at rendering the inner surfaces of the "corridors" or channels mentioned hydrophobic, rather than the paint as a whole. When the capillary surfaces are hydrophobic they counteract the capillary effect relative to liquids and prevent completely or almost completely water in the liquid form and other liquids from entering the capillaries, but do not influence the capability of the capillaries to transport aqueous vapour and other gaseous substances.

It is possible as diatom shells to use shells of fresh diatoms from which the organic parts have been removed, e.g. by burning. In practice one will however use shells of fossil or subfossil, marine or limnetic deposits of diatoms. A series of such preparations are on the market, frequently under the generic denominations kieselguhr, diatomaceous earth or diatomite (frequently used indiscriminately), but also under numerous trade marks.

The agent used for rendering the capillary walls hydrophobic as mentioned must be a short chain organosiloxane, frequently also called a silicone, having the general formula shown hereinbefore.

These oligosiloxanes are well suited for the present purpose since on one hand they are very hydrophobic and on the other hand because of being oligomers they have a very low vapour pressure whereas monomeric corresponding compounds have a comparatively high vapour pressure like related compounds. Suitable oligosiloxanes for the purpose are "Wacker" ®290L (from Wackerchemie GmbH, Germany) and "Imprägniermittel LO" (from Bayer AG, Germany).

The pigment-volume concentration in the paint according to the invention expediently is within the range of 55–60% at which on one hand the weatherproofness and on the other hand the permeability of aqueous vapour at suitable amounts of kieselguhr and oligoorgano-siloxane are satisfactory when the binders are of good quality.

The amount of kieselguhr in the paint may conveniently according to the invention be 3–10%, calculated on the total weight of the paint including volatile solvent, preferably 5–7%.

The amount of oligosiloxane in the paint may conveniently according to the invention be 10–30% by weight, preferably 15–20%, calculated on the amount of binder except oligosiloxane.

Generally expedient though not absolute ranges of the composition of a paint according to the invention can be as shown by the compositions in the Table below; it shows percentages by weight of the various components, and at the bottom of the Table they are characterized by two number of which the first is the amount of oligomeric organosiloxane expressed as percent of the amount of binder without organosiloxane and the second is the PVC-value.

| Binder | 18.1 | 12.6 | 18.1 | 12.6 |
| Siloxane | 1.8 | 1.3 | 5.4 | 3.8 |
| Pigment | 15.0 | 20.0 | 15.0 | 20.2 |
| Extender | 26.0 | 34.6 | 26.0 | 34.6 |
| Kieselguhr | 5.0 | 6.6 | 5.0 | 6.6 |
| Solvent | 34.1 | 24.9 | 30.5 | 22.4 |
|  | 10,48 | 10,64 | 30,48 | 30,64 |

The paint according to the invention will now be illustrated by an Example of a white paint in accordance with the principles of the invention, and some comparison experiments carried out with this paint.

EXAMPLE

There was prepared a white paint with the characteristic 17,56 (oligosiloxane constituted 17% calculated on the amount of binder excluding oligosiloxane; PVC 56%) from the following ingredients:

|  | kg |
| --- | --- |
| "Pliolite" ® AC 80 (binder) | 7.8 |
| ""Impragniermittel LO" (siloxane) | 2.7 |
| Chloroparaffine (plasticizer) | 7.6 |
| Soya lecithin (wetting agent) | 0.1 |
| Titanium dioxide (pigment) | 17.5 |
| Dolomite (extender) | 30.4 |
| Kieselguhr | 5.8 |
| White spirit (solvent) | 28.1 |
|  | 100.0 |

"Pliolite" AC 80 is a film-forming resin (Newtonian), a styrene-acrylic copolymer. "Imprägniermittel LO", also denoted "Baysilone-Imprägniermittel Versuchsprodukt AC 3107" is a 80% solution in a liquid aliphatic hydrocarbon mixture of a silicone resin oligomer within the general formula shown hereinbefore.

When applied in the usual manner—with brush or spraying apparatus—this paint in two strokes produces after drying a film of a thickness of about 160 $\mu$m which has a diffusion of about 25 mg/cm$^2$ per day at a relative moisture difference of 5–100%, and a watertightness of 90–100% at 10 mm water pressure, in both cases without being washed out. As a freshly dried film this paint has about double as high a diffusibility as a common water-based plastic paint and its watertightness is on a level with that of a socalled coal tar epoxy.

These relations are to be illustrated more fully hereinbelow, partly with reference to the drawing wherein FIG. 1 illustrates diffusion-openness of the paint according to the Example compared to that of an ordinary water-based emulsion paint, in both cases before and after washing out and as a function of the thickness of the dry paint film, and FIG. 2 the absorption of water into a concrete surface as a function of time, the concrete surface being partly untreated, partly coated with the paint according to the invention and for comparison with several known types of paint.

The diffusion of aqueous vapour through the film is determined according to the socalled 0/100 method. The determination is carried out in a closed container with concentrated $H_2SO_4$ in the bottom. In the container there is suspended—above the $H_2SO_4$—a capsule with water in the bottom. The upper wall of the capsule is an unsupported film of the paint the diffusibility of which is to be determined. The film is distended in a manner so as to close the top of the capsule whereby aqueous vapour can only leave it by diffusing through the paint film. The atmosphere in the capsule is saturated with aqueous vapour (100% relative humidity) and the degree of diffusion is determined by the amount of vapour escaping from the water in the capsule into the sulphuric acid contained in the container per unit time.

In FIG. 1 the abscissa represents the thickness of the dry paint film in μm and the ordinate the flow of aqueous vapour in mg/cm² per day. Curve a shows the vapour permeability of the paint according to the Example before, curve b of the same after washing out; curve c shows the vapour permeability of an ordinary water-based emulsion paint before, curve d of the same after washing out.

It is known that the permeability for aqueous vapour is influenced by weathering of the paint, notably by the action of rain; in order to simulate this action the dry paint films were washed out in water in liquid form for a week and the diffusion measurements were made at various film thicknesses prior to and after washing out. It is known that the diffusibility through ordinary water-based emulsion paints decreases after washing out with water, as is seen from FIG. 1 which also shows that the diffusibility through the paint according to the invention increases by the washing out.

The water-based emulsion paint used in the comparison experiment (and the comparison experiments discussed in the following) as the binder contained an emulsion of a styrene-acryl-copolymer in water, as the pigment titanium dioxide, as extenders talc powder, dolomite and aluminium silicate and as additives amongst others an anti-foaming agent, a wetting agent and a film forming agent. The PVC of this paint was 42% and its content of solids 35% by volume.

It is seen from FIG. 1 that the paint according to the invention, applied as two coatings having a total thickness in the dried condition of 160 μm has 2-4 times as high a diffusion-openness as an ordinary plastic paint, applied as three coatings of a total thickness in the dried condition of 105 μm.

FIG. 2 shows a relative absorption of water in concrete surfaces during 14 days. The ordinate represents the absorption of water which into the untreaded concrete surface, expressed as percent of the total absorption during 14 days; and the abscissa the time in days.

Curve a thus shows the absorption of water from day 0 to day 14 into the untreated concrete surface, curve b the absorption of water into a corresponding concrete surface coated with a water-based emulsion paint as just described, curve c into such a concrete surface coated with the paint according to the Example, curve d the absorption of water into such a concrete surface coated with a chlororubber paint (CR paint) and finally curve e the absorption of water into such a concrete surface coated with coal tar epoxy.

CR-paint contains chlororubber as the binder; chlororubber is a chlorinated rubber (caoutchouc), e.g. chlorinated neoprene. The CR-paint employed in the experiments was composed of a mixture of chloroprene (chlorinated neoprene) and chlorinated aliphatic hydrocarbons in the ratio 9:10 as the binder, titanium dioxide as the pigment, heavy spar as the filler, thickening agent and other additives, and aromatic hydrocarbons as the solvent. The PVC was 20, the solids content 46% by volume.

Coal tar epoxy is a mixture of epoxy resin and coal tar pitch, the latter one of the most watertight materials at all known for coating surfaces with the aid of usual painting tools such as a brush or a spray gun.

The coal tar epoxy used in the experiments illustrated by FIG. 2 was composed of coal tar pitch, epoxy resin having an epoxy equivalent number of 185, a polyaminoimidazoline as the setting agent, talc powder, mica and heavy spar as fillers, thickening agent and other additives as in the other comparison paints and aromatic hydrocarbons as the solvent. It had a PVC value of 13 and a solids content of 84% by volume.

It is seen from FIG. 2 that the paint according to the invention has a similar watertightness as that of the most watertight known types of paint (coal tar epoxy and CR-paint), but about double as high as vapour flow as the ordinary water-based emulsion paint.

We claim:

1. A water-repellent and vapor-permeable paint, suitable for outdoor surfaces, concrete surfaces and surfaces in "wet" rooms indoors, said paint comprising one or more fillers selected from the group consisting of pigments and particulate extenders, a continuous phase consisting of at least one volatile organic solvent, at least one organic binder selected from the group consisting of acrylic and methacrylic resins, said binder also comprising at least one non-crosslinked oligomeric alkyl-substituted organosiloxane, wherein
   (a) the paint has a pigment-volume concentration (PVC) within the range of 47 to 65%;
   (b) the paint, as part of said filler, contains diatom shells in an amount of 3 to 10% of the paint including volatile solvents;
   (c) one or more non-crosslinked oligomeric alkyl-alkoxy organosiloxanes are present as part of said continuous phase and having the general formula

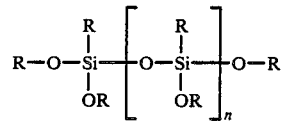

wherein the group R, which may be identical or different, each denotes a $C_{1-8}$ alkyl group and n is a number from 3 to 8, said oligomeric organosiloxane being present in an amount of 10 to 30% of the weight of binder excluding the oligomeric organosiloxane, said diatom shells having inner surfaces which have been rendered hydrophobic by said one or more non-crosslinked oligomeric alkyl-alkoxy organosiloxane.

2. A paint according to claim 1, and further including other binders compatible therewith.

3. A paint according to claim 1, wherein the PVC value is 55 to 60%.

4. A paint according to claim 1, wherein said diatom shells are present in the paint in an amount of 5% of the total weight of the paint including volatile solvents.

5. A paint according to claim 1, wherein the oligomeric organosiloxane is present in the paint in an amount of 15 to 20% of the weight of binder excluding the oligomeric organosiloxane.

* * * * *